Figure 9:
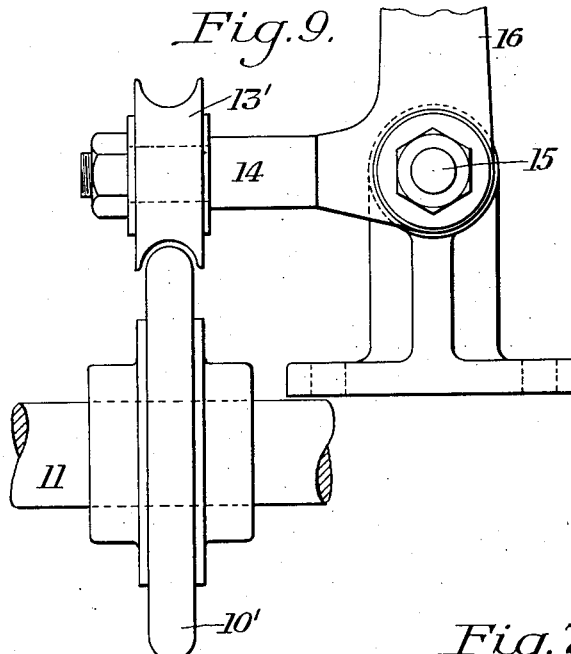

Oct. 9, 1928.  
A. LAUGHLIN, JR  
1,686,701  
METHOD AND APPARATUS FOR THE MANUFACTURE OF TUBES  
Filed March 27, 1924   4 Sheets-Sheet 1
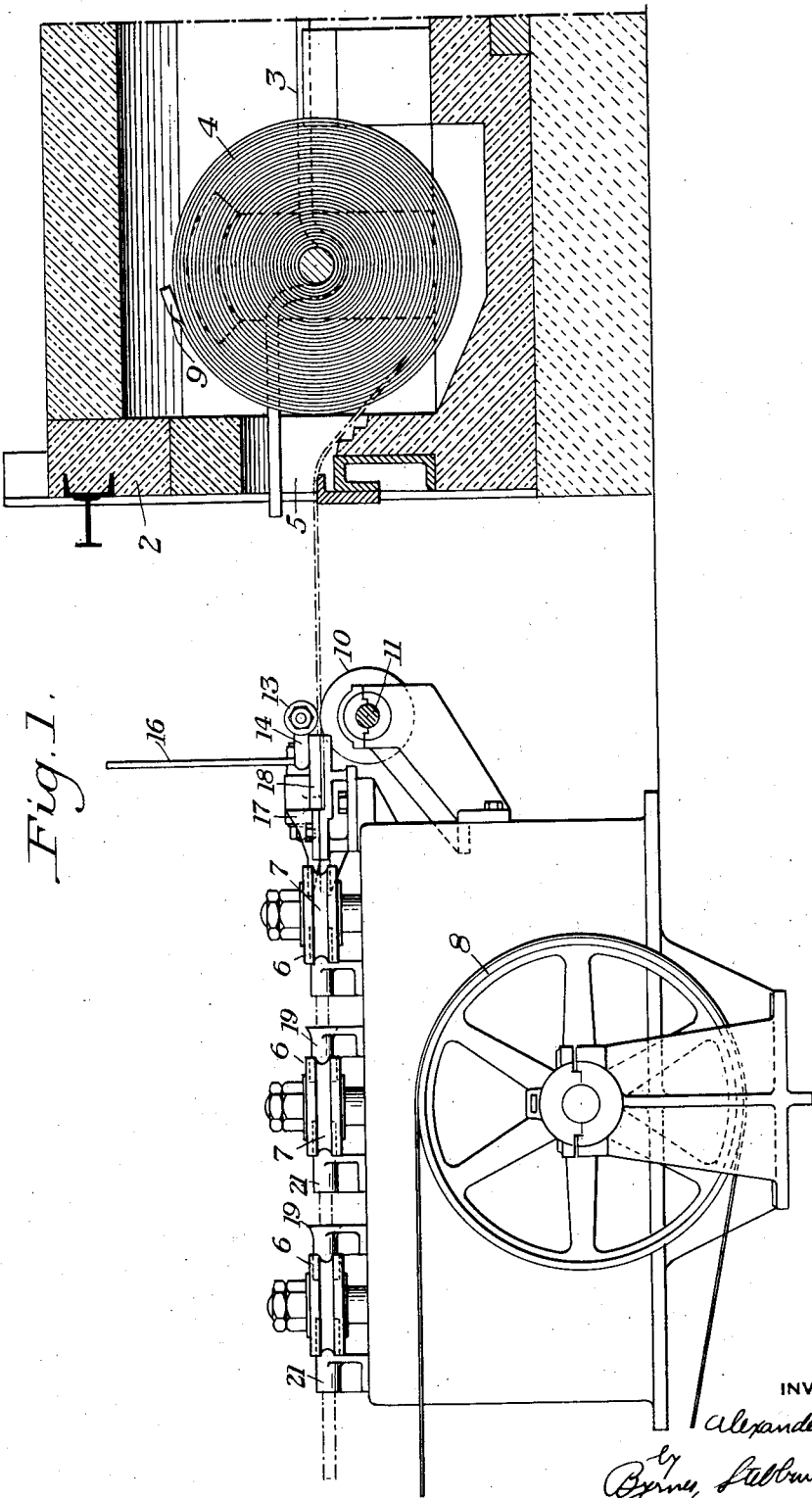
INVENTOR  
Alexander Laughlin Jr.  
by Byrnes, Stebbins & Parmelee  
his attys.

Oct. 9, 1928.
A. LAUGHLIN, JR
1,686,701
METHOD AND APPARATUS FOR THE MANUFACTURE OF TUBES
Filed March 27, 1924
4 Sheets-Sheet 2
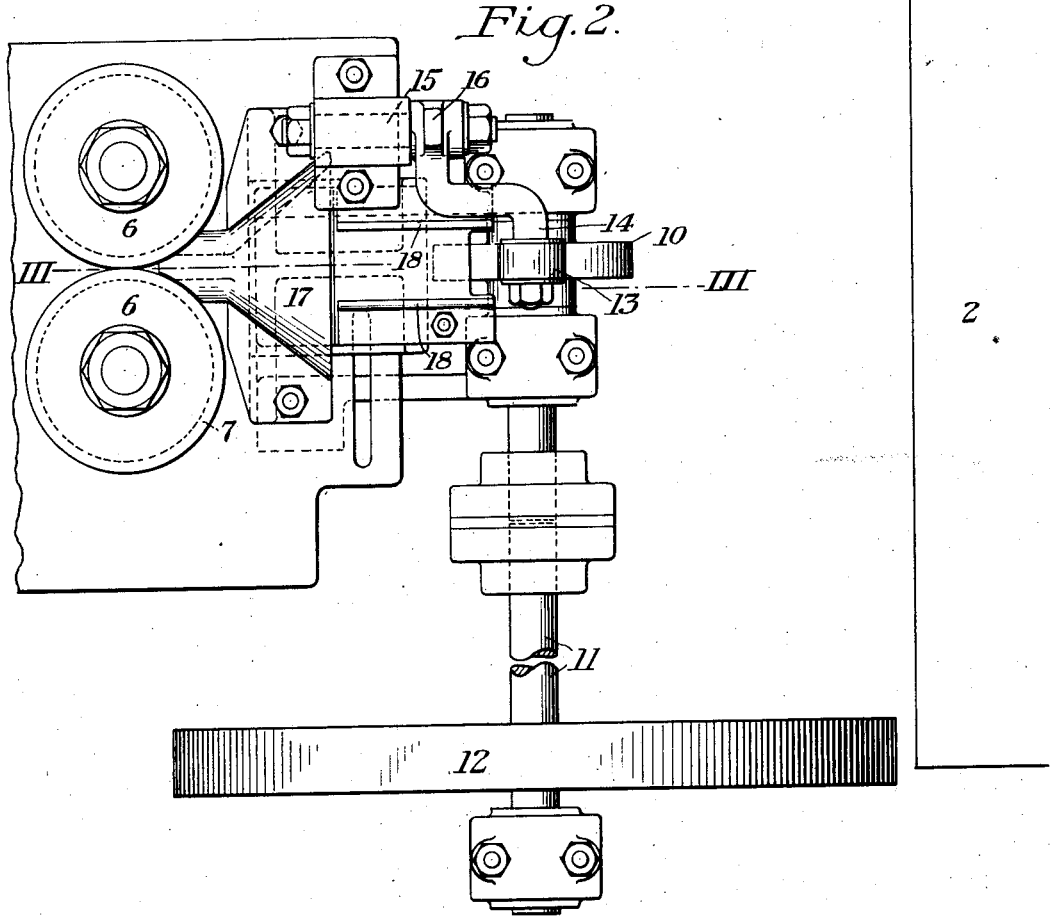
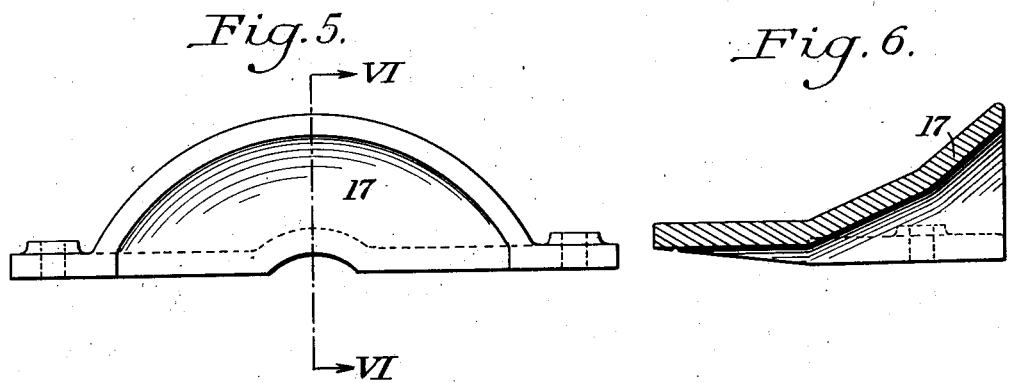
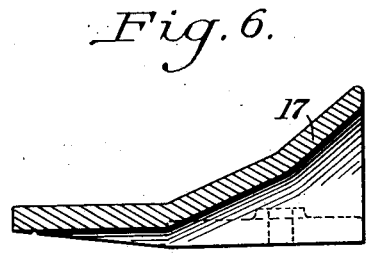
INVENTOR
Alexander Laughlin, Jr.,
Byrnes, Sattini & Parmelee,
his attys Oct. 9, 1928.  
A. LAUGHLIN, JR  
1,686,701  
METHOD AND APPARATUS FOR THE MANUFACTURE OF TUBES  
Filed March 27, 1924  
4 Sheets-Sheet 3
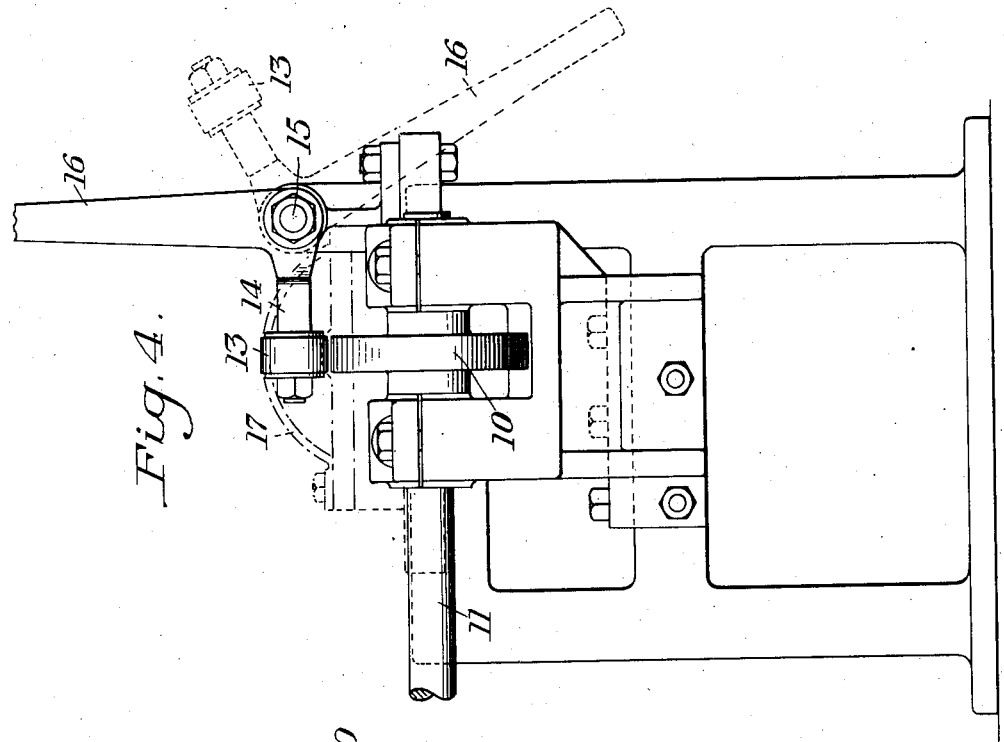
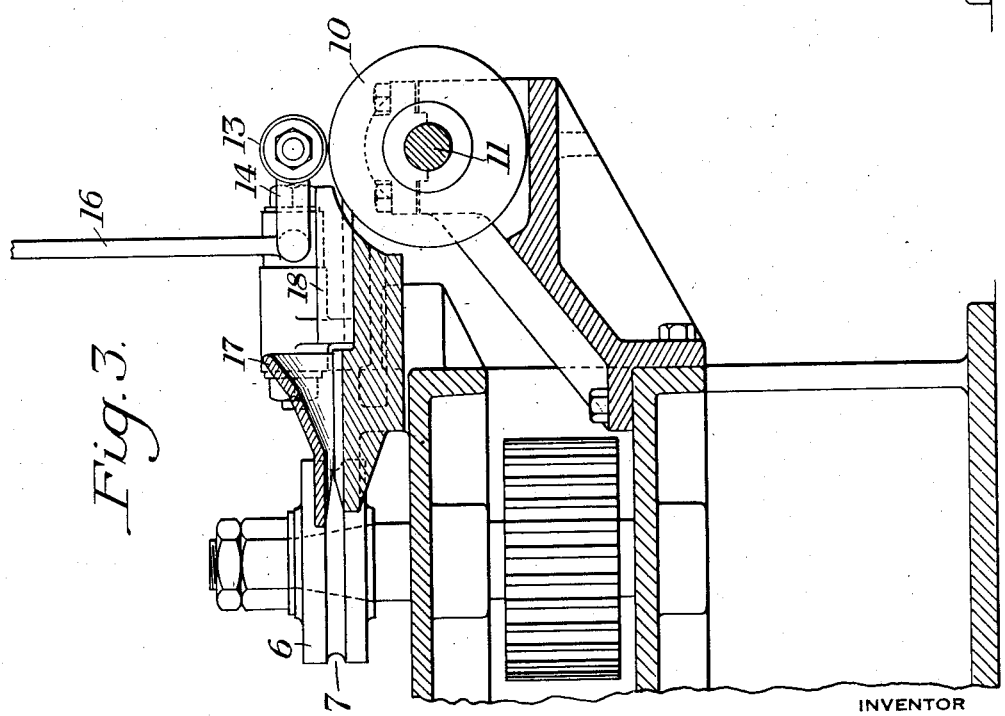
INVENTOR  
Alexander Laughlin Jr.

Oct. 9, 1928.

A. LAUGHLIN, JR 1,686,701

METHOD AND APPARATUS FOR THE MANUFACTURE OF TUBES

Filed March 27, 1924    4 Sheets-Sheet 4

INVENTOR
Alexander Laughlin, Jr.
by Byrnes, Stebbins & Parmelee,
his attys

Patented Oct. 9, 1928.

1,686,701

UNITED STATES PATENT OFFICE.

ALEXANDER LAUGHLIN, JR., OF EDGEWORTH, PENNSYLVANIA; MARGARET M. LAUGHLIN AND THE UNION TRUST CO. OF PITTSBURGH, EXECUTORS OF SAID ALEXANDER LAUGHLIN, JR., DECEASED, ASSIGNORS TO CENTRAL TUBE COMPANY, OF PITTSBURGH, PENNSYLVANIA, A CORPORATION OF PENNSYLVANIA.

METHOD AND APPARATUS FOR THE MANUFACTURE OF TUBES.

Application filed March 27, 1924. Serial No. 702,261.

The present invention relates broadly to the manufacture of tubes or pipes, and more particularly to the manufacture of so-called butt-welded tubes, the term "tubes" being used throughout the specification and claims in a generic sense.

In accordance with the present practice, it is customary to form tubes of the general character herein contemplated, and particularly in the larger sizes, from substantially flat strip or skelp in comparatively short lengths, by first heating the same to the required temperature and thereafter passing it between suitable forming means effective for gradually bringing the heated edges together under welding pressure for effecting the weld. Such tubes are customarily drawn through the forming means under great tension.

In my co-pending application, Serial No. 674,844, filed November 15, 1923, I have disclosed an improved method for the manufacture of tubes from relatively longer strips of material by preforming the leading end and utilizing a forming means comprising rolls for advancing and shaping the strip. One of the objects of the present invention is to provide improved means for effecting movement of the preformed end into the forming means.

In the accompanying drawings there are shown, for purposes of illustration only, certain preferred embodiments of the present invention, it being understood that the drawings do not define the limits of my invention as changes in the construction and operation therein disclosed may be made without departing from the spirit of the invention as expressed by the scope of my broader claims.

In the drawings:—

Figure 10:
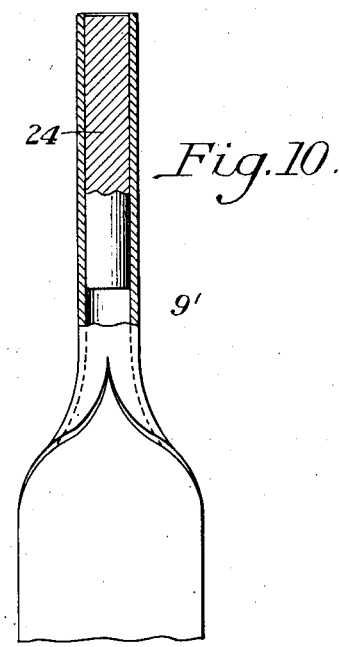
Figure 7:
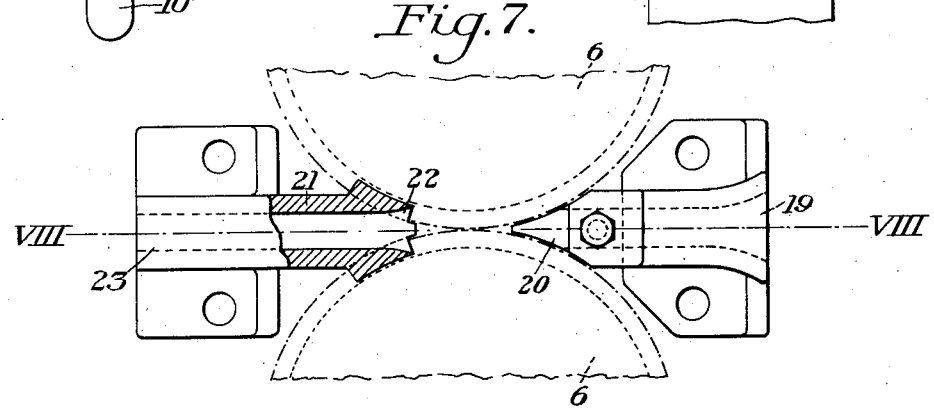
Figure 8:
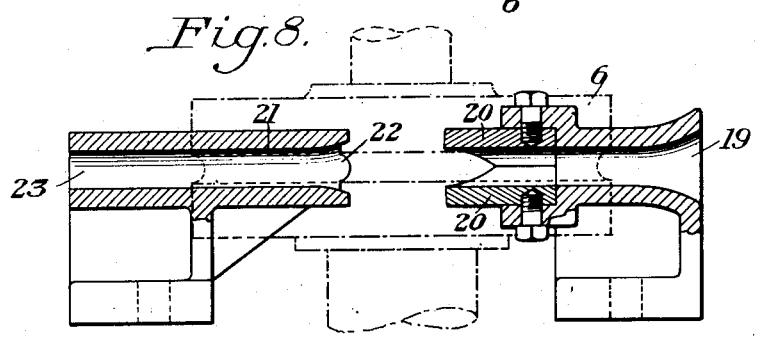

Figure 1 is a side elevation, partly in section, of forming means embodying the present invention in operative relation to a furnace, Figure 2 is a top plan view of a portion of the apparatus illustrated in Figure 1, Figure 3 is a vertical sectional view on the line III—III of Figure 2, Figure 4 is a front elevation of the construction illustrated in Figure 3, Figure 5 is a detail view on an enlarged scale of a portion of the guide, Figure 6 is a vertical sectional view on the line VI—VI of Figure 5, Figure 7 is a detail view on an enlarged scale illustrating one form of guiding means between successive rolls of the forming means, Figure 8 is a horizontal sectional view on the line VIII—VIII of Figure 7, Figure 9 is a view similar to Figure 4 illustrating a slightly modified embodiment of the invention, and Figure 10 is a detail view, partly in section and partly broken away, illustrating a preformed end of a strip having a sustaining plug in position therein.

In carrying out the present invention there may be provided a furnace 2 having mounted therein supports 3 which may be cooled in any desired manner as found necessary, and adapted to receive coils 4 of skelp or strip from which the tubes are to be formed. The furnace may be heated in any desired manner to bring the temperature of the strip to the desired point for effecting welding of the edges, and is provided with a drawing opening 5 through which the heated material may be drawn and passed to the forming means.

I have herein illustrated this forming means as comprising a plurality of pairs of rolls 6 mounted for rotation upon vertical axes and having in their peripheral faces grooves 7 of such dimensions that during the passage of the material therebetween the heated edges thereof are brought into abutting relationship, the weld initiated and completed, and the tube sized. By reason of the provision of the material from which the tube is to be formed in greater lengths than ordinarily contemplated, I am able to reduce scrap losses to a minimum, as will be well understood. The forming means very advantageously cooperates with such lengths of material for the reason that it not only shapes and welds the same, but produces the actual feeding movement thereof, the rolls being driven in any desired manner, as by intergearing the same and providing a driving pulley 8.

Due to the temperature to which the material must be raised to insure proper welding thereof, it is extremely difficult to handle and it is, therefore, necessary to provide means for quickly and positively feeding the material from the furnace to the forming means. As pointed out in my application before referred to, the leading end 9 of the material is preshaped to bring the edges into, or substantially into, abutting relationship so that the end has, generally, the cross section of a completed tube. This facilitates passage of the end into the first roll pass in the forming means. It will be apparent, however, that with a forming means of the character illustrated it is not feasible to utilize tongs as ordinarily used with the draw bench method. In operation, therefore, the coils are charged into the furnace in such manner that the preformed end of each of the coils assumes, generally, the position illustrated in Figure 1. After the material has been brought to the required temperature, this end is grasped in any desired manner and drawn downwardly so that it may readily pass through the opening 5 without imparting any considerable strain to the strip. In this manner the preformed end may be brought into a position adjacent the roll pass in the first pair of rolls of the forming means. For insuring the passage of the preformed end into this roll pass there may be provided feeding means, here illustrated as comprising a lower pinch roll 10 mounted on a shaft 11 adapted to be driven in any desired manner, as by a pulley 12. Cooperating with the lower pinch roll 10 is an upper pinch roll 13 of considerably smaller diameter mounted on an arm 14 having a pivotal bearing 15 and adapted to be moved into and out of operative position by means of a handle 16, as more clearly apparent from Figure 4. The handle 16 is first operated to move the upper pinch roll into the dotted line position shown in Figure 4, to permit the preformed end of the strip to be drawn across the lower pinch roll. The upper pinch roll is then quickly brought into position to grip the strip immediately in back of the preformed end, for advancing the same.

Intermediate this feeding means and the first roll pass is a guide which is preferably split so as to provide a removable upper section or guard plate 17. This guide is so shaped as to receive the preformed end and to curl the edges of the strip inwardly and downwardly as it passes therethrough and prepare it for the first roll pass. As soon as the strip is advanced sufficiently far to bring the preformed end into engagement with the forming means, the feeding means becomes unnecessary and may be thrown out of operation.

By utilizing material in coiled form, each successive convolution acts as a shield for the convolution immediately preceding and tends to prevent the central body portion of the strip from being heated to as high a temperature as that to which the edges, which are in direct contact with the flame, are heated. This is highly desirable with a feeding means of the character herein shown, in which the width of the pinch rolls is preferably such that they contact only with the intermediate portion of the strip and do not engage or cool the edges thereof. For accurately alining the strip as it passes through the feeding means the lower guide section may be provided with guide plates 18 of generally angular cross section.

In Figures 7 and 8 I have illustrated guiding means adapted for use with the delivery side of each of the roll passes of the forming means, and with the entering side of each of the roll passes after the first. This guiding means for the entering side of each of the rolls may comprise a flared generally tubular guide 19 having removable and renewable die forming portions 20. For the delivery side of each of the rolls there may be provided a somewhat similar guide 21 having a flared receiving end 22 extending between the rolls and a tubular discharge end 23.

In certain cases it may be desirable to positively prevent the preformed ends of the strips from collapsing under the temperature conditions to which they are subjected, and during the operation of withdrawing them from the furnace. For this purpose each preformed end 9', as illustrated in Figure 10, may have placed therein a plug 24 of suitable refractory material having sufficient strength to support the walls of the strip as desired.

In Figure 9 there is illustrated a slightly modified embodiment of the invention in which the lower pinch roll 10' is illustrated as having its peripheral surface convex transversely thereof. The upper pinch roll 13' in such cases will have its peripheral surface concave in transverse section. Such a construction will tend to bend a strip passing between the rolls to substantially U-shape, thereby facilitating the subsequent operation of the forming means.

The advantages of the present invention arise from the provision of a forming means comprising at least one pair of forming rolls, of feeding means for positively insuring the passage of the entering end of a strip of material therebetween.

Still further advantages of the present invention arise from the provision of a pair of pinch rolls adapted to engage a strip of material immediately in back of the preformed end, for feeding such end into operative position with respect to forming means.

I claim:

1. Apparatus for the manfacture of tubing, comprising feeding rolls, forming means behind said rolls said forming means comprising a plurality of pairs of rolls operable about vertical axes, the same being arranged to successively act on material to be formed into tubes, and means for moving one of the feeding rolls away from the other, whereby the material may be readily positioned between the rolls and the rolls closed to feed the material to the forming means.

2. Apparatus for the manufacture of tubing, comprising feeding rolls, forming means behind said rolls said forming means comprising a plurality of pairs of rolls operable about vertical axes, the same being arranged to successively act on the material to be formed into the tubes, pivoted means for moving one of the feeding rolls away from the other, and manually operable means for operating such pivoted means whereby the material may be readily positioned between the rolls and the rolls closed to feed the material to the forming means.

3. Apparatus for the manufacture of tubing, comprising feeding rolls, forming means behind said rolls, said forming means comprising a plurality of pairs of rolls operable about vertical axes, the same being arranged to successively act on the material to be formed into the tubes, means for moving one of the feeding rolls away from the other, and a hand lever for controlling such movement, whereby upon operation of the lever the rolls may be closed upon material placed therebetween.

In testimony whereof I have hereunto set my hand.

ALEXANDER LAUGHLIN, Jr.